Figure 1:
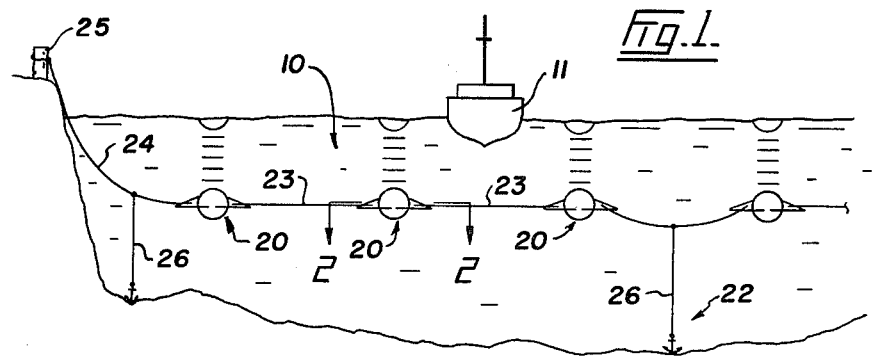

United States Patent [19]

Koblanski

[11] 4,235,711

[45] Nov. 25, 1980

[54] MEANS AND METHOD FOR SWEEPING MATERIAL FLOATING ON WATER USING VIBRATIONAL ENERGY

[75] Inventor: John N. Koblanski, North Vancouver, Canada

[73] Assignee: Ocean Ecology Ltd., Edmonton, Canada

[21] Appl. No.: 38,320

[22] Filed: May 11, 1979

Related U.S. Application Data

[63] Continuation of Ser. No. 832,980, Sep. 14, 1977, abandoned.

[51] Int. Cl.³ .............................................. E02B 15/04
[52] U.S. Cl. .................................... 210/748; 210/923; 210/801; 210/24 S
[58] Field of Search ................. 210/19, 242, DIG. 22, 210/DIG. 25, 24, 42, 84; 55/277

[56] References Cited

U.S. PATENT DOCUMENTS

| 3,730,346 | 5/1973 | Prewitt | 210/DIG. 25 |
| 4,032,438 | 6/1977 | Koblanski | 210/19 |

OTHER PUBLICATIONS

High Intensity Ultrasonics, Brown & Goodman, pp. 217-220, D. Von Nostrand Co., Inc., Princeton, NJ.

Primary Examiner—Theodore A. Granger
Attorney, Agent, or Firm—Fulwider, Patton, Rieber, Lee & Utecht

[57] ABSTRACT

An apparatus for sweeping contaminating material such as oil along the surface of a body of water using acoustic waves as a propelling force. The vibrational waves are produced by a device supported below the water surface and aimed upwardly towards a peripheral edge of the oil spill. Vibrational waves generated when the device is activated strike the air above the water surface and as a result are compacted into a flattened and horizontally elongated zone of vibrational energy which exerts a driving force on the oil spill edge. A method of employing sound as a sweeping force.

9 Claims, 5 Drawing Figures

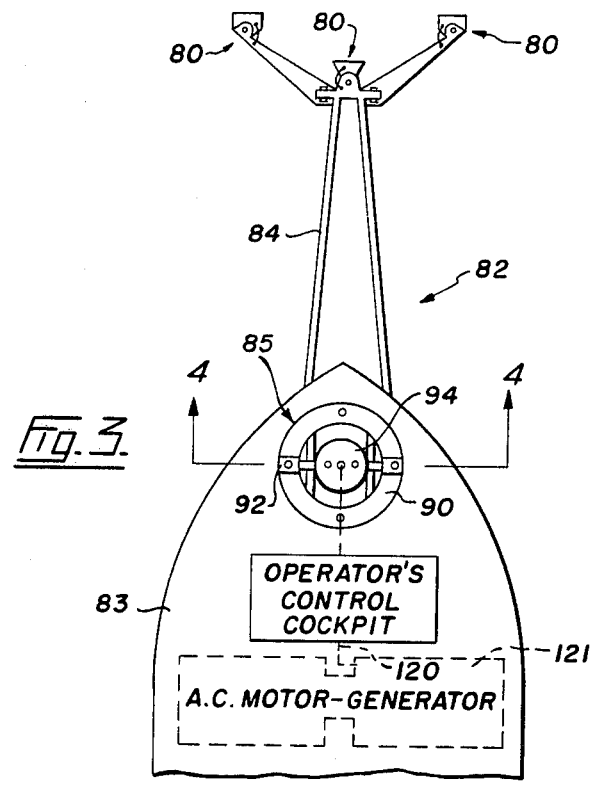
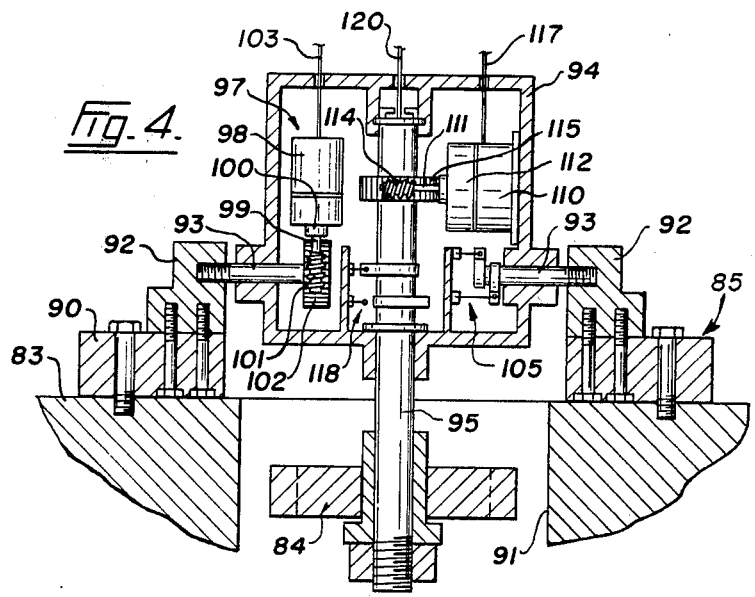

MEANS AND METHOD FOR SWEEPING MATERIAL FLOATING ON WATER USING VIBRATIONAL ENERGY

This is a continuation of application Ser. No. 832,980, filed Sept. 14, 1977, now abandoned.

This invention relates to apparatus and a method for containing and gathering up material contaminating the surface of a body of water. When oil or the like is spilled into a harbour or other body of water, the most immediate problem is to contain the oil so that it will not spread to such an extent that it is not practical or worthwhile to even try and remove the spillage. Sometimes a floating boom is used in an attempt to stop the spread of waterborne contaminants but the sheer physical task of assembling a lengthy boom, as is normally required, and of the maneuvering the boom into a position where it might be effective, results in a delay which can render the whole exercise futile. Furthermore, a boom can only be successfully employed when water conditions are ideal, which seldom is the case. Generally speaking, the present invention contemplates the use of acoustical energy to provide, in effect, a huge broom which can be wielded to sweep floating oil or the like into a confined area from where it can more readily be picked up by other means.

More specifically, apparatus according to the present invention comprises a sound producing device having a member capable of transmitting a shaped and intensified ray of vibrational energy, support means for supporting the device with at least the member disposed below the water surface in a position to direct the ray upwardly towards the floating material at a selected grazing angle relative to the water surface, and means for activating the sound producing device to generate the ray and produce at the water surface incidental to said ray, reacting with air thereabove, a horizontally elongated and vertically flattened zone of vibrational energy capable of exerting a propelling force on the floating material.

Figure 2:
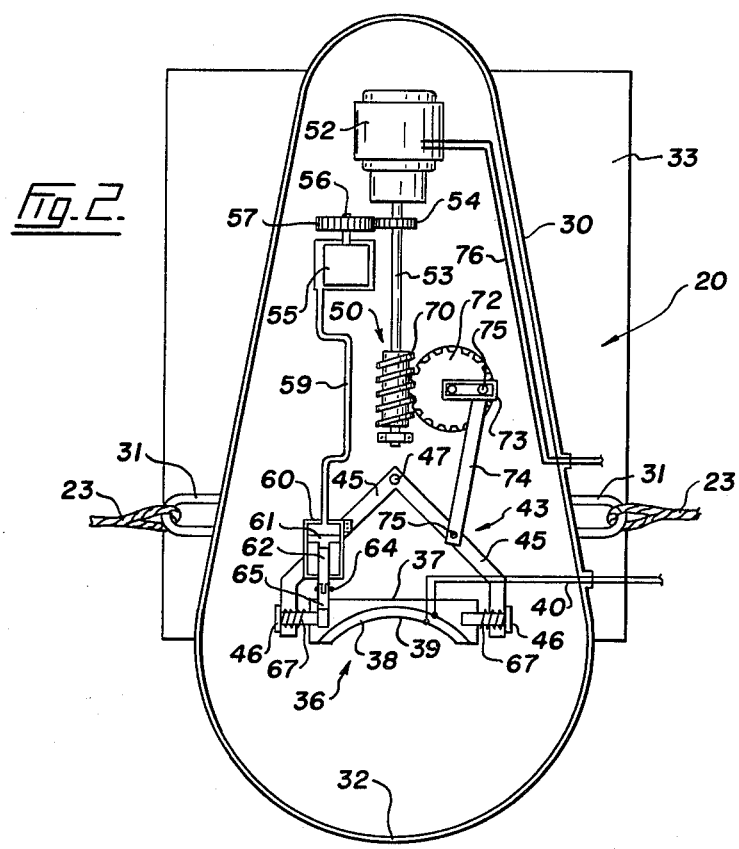
Figure 5:
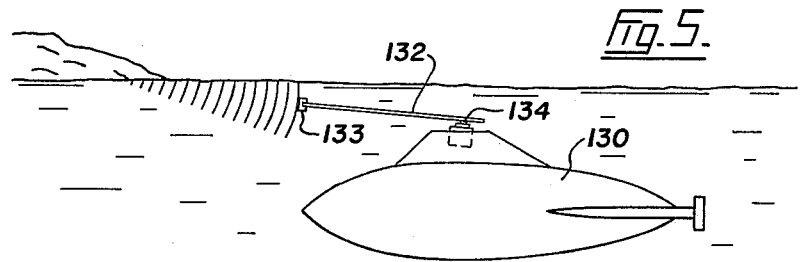

In drawings which illustrate preferred embodiments of the invention,

FIG. 1 is a schematic view showing one embodiment of the present invention in a typical position of use, FIG. 2 is longitudinal and schematic section showing apparatus of this embodiment taken on lines 2—2 of FIG. 1, FIG. 3 is a schematic plan view of another embodiment of the present invention, FIG. 4 is a vertical section taken on the line 4—4 of FIG. 3, and FIG. 5 is a schematic side elevation of still another embodiment of the present invention.

Referring to FIG. 1 of the drawings, there is shown by way of example one use of the present invention. The numeral 10 represents a river channel which is navigated by ships 11, and the vessel illustrated in FIG. 1 is assumed to be moving upstream or against the river current. An oil spill in such a river channel presents a major clean up problem since it spreads so quickly but downstream movement of oil or other contaminating materials such as wood chips and the like can be halted by use of apparatus according to the present invention, a number of which may be arranged as shown schematically in FIG. 1.

The numeral 20 indicates generally a sonic sweeping apparatus, a suitable number of which are shown in FIG. 1 supported below the water surface by means generally indicated at 22. The support means 22 for this embodiment is an anchor assembly formed of cables 23 and 24, the ends of the latter cables being suitably anchored as at 25 on land bordering the channel. Anchor cables 26 hold the cables 23, and therefor the apparatuses 20, a suitable distance below the surface of the channel so that ships and floating debris can pass without interference.

Referring now to schematic FIG. 2, each apparatus 20 is shown to comprise a hollow vessel 30 which is provided with laterally projecting lugs 31 to which the cables 23 are attached. The vessel 30, which has a plastic dome 32, is supported by the cables with the dome facing upstream. Horizontal stabilizers 33 are provided on the hollow vessel, the stabilizers each being disposed at a slight angle to the horizontal axis of the vessel so that the river current acts to hold the apparatus tilted upwardly. Preferably, the vessel 30 is filled with silicone oil which has not been indicated or enumerated in the schematic FIG. 2.

Suitably mounted within the vessel 30 is a sound producing device 36 which comprises a body 37 and a member 38 capable of transmitting vibrational energy to a fluid medium such as water. Preferably, the member 38 used in this embodiment of the invention is a transducer consisting of a polarized ceramic dish having a concave face 39 from which acoustical waves are emitted when the ceramic material is energized electrically. For this purpose, a suitable electric circuit 40 connects the member or transducer 38 to a source of high frequency alternating current (not shown) on land near the channel 10, some of the wires of the circuit being carried by the cables 23. Thus, the focused transducer 38 can be energized to produce vibratory waves which are directed forwardly of the vessel 30 through the dome 32. These waves are concentrated or shaped as well as intensified by the transducer to form a ray of acoustical energy. The wave frequency may be in either the sonic or ultrasonic range.

Transducer 38 is mounted within the vessel 30 by means generally indicated at 43. This mounting means 43 includes a V-shaped yoke 45 which carries opposing pivot pins 46, the device 36 being supported by the pins to rock about the transverse and substantially horizontal axis of the pins. The yoke 45 can swing about the vertically disposed axis of a pivot pin 47 which secures the yoke to a suitable part within the hollow vessel.

A drive mechanism generally indicated at 50 serves to rock the device 36 about the horizontal and vertical axes of the pins 46 and 47. The mechanism 50 is shown to comprise an electric motor 52 which drives a shaft 53 through a reduction (not shown), the shaft being fitted with a pinion 54. A self-contained displacement pump 55 is positioned alongside the shaft 53 and a driven shaft 56 of this pump carries a gear 57 which meshes with the pinion 54. The outlet from the pump 55 is connected by a conduit 59 to a cylinder 60 fitted with the piston 61 having a rod 62. A pin 64 pivotally connects the piston rod to one end of crank 65 which has its opposite end (not shown) suitably secured to the body 37. Both pivot pins 46 are fitted with springs 67 which bias the device 36 so that normally the piston 61 is urged towards the conduit end of the cylinder 60.

The mechanism 50 also includes separate a drive train between the electric motor and the member 45. This train comprises a worm 70 which is fitted to the shaft 53. A gear 72 is rotatably mounted on an interior part of the vessel 30 to engage this worm. Worm gear 72 is fitted with a crank 73. The member 45 and the crank 73 are pivotally connected together by a rod 74 and pins 75.

The motor 52 is connected into an electric circuit 76 which extends out of the hollow vessel 30 and along the cables 23 to a suitable source of low frequency electric power on land. Thus, the motor 52 can be driven while high frequency current is delivered separately to the transducer 38. Rotation of the electric motor 52 causes similar movement of the pump 55 whereby pulsating hydraulic pressure is delivered to the cylinder 60. This causes the piston rod 62 to extend against the pressure applied by the springs 67 and later to retract under spring pressure. The transducer 38, as a result, is rocked about the horizontal axis of the pivot pins 46. At the same time, rotation of the shaft 53 results in the transducer 38 being swung back and forth about the pivot pin 47.

In operation, the device 36 is electrically energized so that the transducer 38 produces acoustical waves. Frequencies below ultrasonic are preferred since there is less attenuation when travelling through water. The upwardly directed sound waves diverge from the centre of the transducer as a ray which reaches the surface of the water at a collective angle of incidence relative to the water surface, which angle is commonly referred to as the grazing angle. At the surface, the acoustic waves encounter the air above the water surface and the air, of course, has an impedance factor much less than that of water. This results in a zone of vibrational energy being developed which is directed forwardly to act upon the contaminating layer of oil which then becomes a sound channel or wave guide for the energy. The zone is very narrow vertically, or not much thicker than the oil layer itself. On the other hand, the zone is greatly elongated horizontally due to the normal propagation of the sound waves and the fact that the vibrational energy is trapped between the air and water surfaces. This creates a thin and fanned-out zone of vibrational energy which is largely confined to the oil layer and is further intensified as a result of being flattened so as to serve as a horizontally directed propelling force. The resultant force is applied in such a way that the zone of vibrational energy becomes a sonic or dynamic barrier for the oil or other contaminating substances. The oil being carried downstream encounters this sonic barrier which extends from bank-to-bank between the several apparatuses 20 and, as a result, is brought to a halt. In other words, a sweeping action results since the water continues its downstream flow.

The oil starts to accumulate at the sonic barrier almost as if it had encountered a solid boom and eventually this steadily increasing accumulation must be removed, as well be explained later.

If the water surface is quite smooth, the sonic sweeping apparatus 20 will operate effectively as described above without the transducer being oscillated within the vessel 30. The water surface, however, is often roughened by the wind and the action of passing boats so that it is best if the transducer 38 is oscillated about the horizontal axis provided by the pins 46. The motor 52 is run continously when the water is rough and, through the mechanism 50, the sound producing device is caused to rock back and forth on the pins 46 whereby to continuously vary the grazing angle. This rocking motion provides the sonic barrier with a fore and aft sweeping action simulating that of a broom being used on a floor. As a result, the oil is brushed or stroked along the water surface which helps to sweep up or provide a herding action with regard to any small patches of oil which might otherwise escape past the sonic barrier because of the roughened surface of the water.

The transducer 38 is also oscillated about the axis provided by the pivot pin 47 and this provides a horizontal sweeping action which further improves the effectiveness of the sonic barrier. The sideways sweep imparted to the barrier also helps to gather up stray patches of oil and add them to the accumulation. In addition, the horizontal sweeping action increases the effective width of the zone of vibrational energy provided by each sonic sweeping apparatus 20 so that fewer such devices need be used in the arrangement shown in FIG. 1.

Preferably, the oil accumulated at the sound barrier is picked up by the method and apparatus for ultrasonically removing contaminants from water as described in U.S. Pat. No. 4,032,438 which was granted on June 28, 1977 to this applicant.

There are other pieces of equipment which can be used to remove the oil gathered at the sonic barrier and one is a conventional weir-type oil skimmer which executes a skimming action as the name implies. Other equipment presently available will slurp the oil up off the water surface but both the oil skimmer and the oil slurp are effective only when the contaminating material is concentrated within a relatively small area as accomplished by use of the present invention.

The sonic sweeping apparatus 20 has been described as being equipped with an electrically energized transducer but it will be noted that other sources of vibrational energy might be employed as well. For example, a hydrodynamic oscillator of conventional design has a sound producing transducer and associated parts which produce the sound waves required for a sonic barrier used to sweep contaminating material floating on the surface of a body of water. An array of transducers may be carried by the support means 22 so as to collectively provide the zone of vibrational energy. The transducers need not be dished but can be flat and associated with lenses, wave guides, reflectors and the like to concentrate or intensify the acoustic waves. Some horns which have a diaphragm or transducer operated by fluid pressure will also serve the intended purpose. Only the wave emitting member of the sound producing device need be submerged below the surface of the water.

FIGS. 3 and 4 illustrate another embodiment of the present invention. In this instance, an array of three sound producing devices 80 are used. These devices are constructed as previously described and are supported by means generally indicated at 82 and comprising a surface vessel 83 fitted with a forwardly-projecting boom 84. The devices are suitably mounted on the forward end of the boom and a mounting means 85 secures the opposite end of the boom to the bow of the boat. The vessel 83 is self propelled and has the usual steering apparatus and so on, as well as the sources of power required for operating the devices 80 and the boom 84.

Referring now to FIG. 4, the mounting means generally indicated at 85 will be seen to comprise an annular base 90 which is mounted on the boat 83 concentric with a vertical opening 91 extending through the hull at the bow. Blocks 92 mounted on this base carry opposing spindles 93 on which a housing 94 is rockingly mounted. A shaft 95 is journalled in the housing to depend through the opening 91 and the opposite or inner end of the boom 84 is fixedly secured to the lowermost end of the shaft. This arrangement allows the boom and therefore the sound producing devices to be swung about the horizontal axis provided by the spindles 93 and the vertical axis provided by the shaft 95.

The housing 94 encloses a drive mechanism generally indicated at 97 for oscillating the boom 84 and therefore the devices 80 about the aforementioned horizontal and vertical axes. Mechanism 97 comprises a motor 98 which drives a shaft 99 through a magnetic clutch 100. A worm 101 on the shaft 99 meshes with a gear 102 non-rotatably secured to one of the spindles 93. Motor 98 is included in a circuit 103 (FIG. 4 only) leading to a source of power (not shown) aboard the boat and controlled by the boat operator. When the motor 98 is energized, the boom 84 is oscillated at a suitably slow speed in a substantially vertical plane and the extent of swing is determined by limit switch means 105.

The drive mechanism 97 includes another electric motor 110 mounted within the housing to drive a shaft 111 through a magnetic clutch 112. This shaft 111 carries a worm 114 engaging a gear 115 which is secured to the shaft 95. Motor 110 has a circuit 117 (FIG. 4) connecting it to a source of power (not shown) aboard the surface vessel 83. The boom 84 is slowly oscillated about the axis of the shaft 95 when the motor 110 is run and the extent of swing is controlled by other limit switch means 118, see FIG. 4.

The sound producing devices 80 are included in a circuit 120 part of which is carried within the boom 84 to the bore of the tubular shaft 95. From the shaft 95, the circuit 120 extends out the top of the housing 94 thence to an A.C. motor generator 121 carried aboard the boat 83. The boat operator, of course, can control the power to the devices 80 as well as to the motors 98 and 110.

The embodiment of the invention shown in FIGS. 3 and 4 is particularly well suited for sweeping up an oil spill in a harbor or elsewhere. For this purpose, the vessel 83 is moved slowly forward with the devices 80 activated and angled upwardly to ensure an appropriate grazing angle. The acoustic waves reach the water surface and react with the air to provide a horizontally elongated and vertically flattened zone of vibrational energy which propels the oil ahead of the boat. The devices 80 are oscillated when required by swinging the boom up and down as well as from side to side so that a thorough sweeping action is assured. The boat 83 is maneuvered around the oil spill to gather the contaminating material into a pool which can be picked up by one of the collectors previously described. For example, the oil can be herded directly into a weir-type oil skimmer.

FIG. 5 shows still another embodiment of the invention wherein a submersible vessel 130 is used to perform the sweeping operation. Vessel 130 carries a boom 132 on which an array of sound producing devices 133 are mounted. The boom 132 is attached to the submarine by mounting means 134 which is the same as the means 85 except that it is inverted on the vessel. Otherwise the construction of this embodiment of the invention is similar to the previously described embodiment and therefore further detailed description is not considered necessary.

The invention shown in FIG. 5 operates in the same manner as the embodiment shown in FIGS. 3 and 4 except, of course, that the vessel 130 is submerged along with the boom 132 and the sound producing devices 133. Use of the submarine will allow an accumulation of oil to be swept up from the surface of a body of water or even from beneath a layer of ice as illustrated in FIG. 5.

I claim:

1. A sweeping method for moving floating material across a water surface, said method comprising the steps of:
    submerging transducer means operative to generate high frequency acoustical waves in a shaped, intensified ray;
    directing said ray upwardly and forwardly for intersection with said surface at an acute, relatively shallow angle within a zone of incidence adjacent said material;
    energizing said transducer means at an energy level sufficient to develop forces against said material characterized by a horizontal vector tending to move said material horizontally in a forward direction; and
    moving said transducer means in a controlled manner to change the position of said zone along a path and thereby sweep said material along said path.

2. A sweeping method according to claim 1 wherein said moving comprises advancing said transducer means through the water.

3. A sweeping method according to claim 1 wherein said moving comprises oscillating said transducer means to shift said zone forwardly and rearwardly.

4. A sweeping method according to claim 1 wherein said moving comprises oscillating said transducer means to shift said zone laterally from side to side.

5. Sweeping apparatus for moving floating material across a water surface, said apparatus comprising:
    submersible transducer means operative to generate high frequency acoustical waves in a shaped, intensified ray at an energy level sufficient to develop forces against said material;
    support means pivotally supporting said transducer means for submergence in an attitude directing said ray upwardly and forwardly for intersection with said surface at an acute, relatively shallow angle within a zone of incidence whereby said forces against said material are characterized by a predominantly horizontal vector tending to move material horizontally in a forward direction; and
    oscillation means operative to pivot said transducer means back and forth and thereby progressively move the position of said zone back and forth along a predetermined path and at a predetermined rate whereby said material is swept horizontally in a forward direction along said path.

6. Sweeping apparatus according to claim 5 wherein said transducer means are supported by said support means for pivotal movement by said oscillation means about a horizontal axis normal to said ray.

7. Sweeping apparatus according to claim 5 wherein said transducer means are also supported by said support means for pivotal movement about a vertical axis and including a drive mechanism coupled to said transducer means for pivoting said transducer means from side to side about said vertical axis to thereby progressively move said zone from side to side.

8. Sweeping apparatus according to claim 5 including a plurality of sets of said transducer means, said support means and said oscillation means, and including an anchorage assembly securing said sets together in spaced-apart relation whereby the respective said zones of incidence of said sets are located side-by-side.

9. Sweeping apparatus according to claim 5 wherein said support means includes a vessel and means for moving said vessel through the water to move the position of said zone along the path of said vessel.

* * * * *